(12) United States Patent
Bissonnette

(10) Patent No.: US 6,277,323 B1
(45) Date of Patent: *Aug. 21, 2001

(54) CUTTING NOZZLE ASSEMBLY FOR A POSTMIXED OXY-FUEL GAS TORCH

(75) Inventor: Claude Bissonnette, Cornwall (CA)

(73) Assignee: Oxy-Arc International Inc., Cornwall (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/349,005

(22) Filed: Jul. 7, 1999

Related U.S. Application Data

(60) Continuation-in-part of application No. 08/995,827, filed on Dec. 22, 1997, now Pat. No. 5,944,915, which is a division of application No. 07/981,352, filed on Nov. 25, 1992, now Pat. No. 5,700,421.

(51) Int. Cl.$^7$ ....................................................... B23K 7/10
(52) U.S. Cl. .................................. 266/76; 266/48; 266/77
(58) Field of Search ............................... 266/76, 48, 904, 266/77, 902, 903; 148/194, 205; 239/421, 419.3, 419.5, 428, 424.5, 288, 288.3, 288.5

(56) References Cited

U.S. PATENT DOCUMENTS

| | | |
|---|---|---|
| 3,590,212 | 6/1971 | Corrigall et al. ..................... 219/130 |
| 3,923,448 | 12/1975 | Guth ..................................... 239/428 |
| 4,443,003 | 4/1984 | Bleys ..................................... 266/48 |
| 4,455,176 | * 6/1984 | Furhop ................................... 266/48 |
| 5,120,026 | 6/1992 | Bissonnette ............................ 266/48 |
| 5,700,421 | * 12/1997 | Bissonnette ............................ 266/48 |
| 5,792,281 | * 8/1998 | Diehl ..................................... 148/205 |
| 5,823,762 | * 10/1998 | Anderson et al. ....................... 431/8 |
| 5,944,915 | * 8/1999 | Bissonnette ........................... 148/205 |

FOREIGN PATENT DOCUMENTS 468938    10/1950    (CA) ..................................... 266/48

* cited by examiner

Primary Examiner—Scott Kastler
(74) Attorney, Agent, or Firm—Pearne & Gordon LLP

(57) ABSTRACT

A novel cutting nozzle assembly for a postmixed oxygen-fuel gas torch is disclosed. The nozzle assembly includes a cylindrical shroud which surrounds and extends away from the gas discharge orifices in the gas discharge end of the cutting nozzle. The cylindrical shroud has the advantage of producing a tighter gas stream and of promoting a more thorough mixing of the preheat oxygen and the fuel gas to provide a hotter, more compact flame which produces a more parallel-sided cut through metal workpieces. The cutting tip therefore conserves metal as well as cutting gases. It also cuts faster than prior art postmixed cutting nozzles.

9 Claims, 6 Drawing Sheets

CUTTING NOZZLE ASSEMBLY FOR A POSTMIXED OXY-FUEL GAS TORCH

RELATED APPLICATIONS

This is a continuation-in-part of application Ser. No. 08/995,827, filed on Dec. 22, 1997 now U.S. Pat. No. 5,944,915, which is a divisional of application Ser. No. 07/981,352, filed on Nov. 25, 1992 and issued to U.S. Pat. No. 5,700,421 on Dec. 23, 1997.

TECHNICAL FIELD

The present invention relates to oxy-fuel gas torches and, in particular, to a cutting nozzle for postmixed oxy-fuel gas torches.

BACKGROUND OF THE INVENTION

Oxy-fuel gas cutting torches are useful for cutting ferrous alloys. With the proper equipment, cuts can be effected through very thick billets. In operation, an oxy-fuel torch is used to direct an ignited stream of oxygen and fuel gas onto the surface of the metal to be cut. The metal is thus heated to its ignition temperature, at which point a stream of cutting oxygen directed at the surface oxidizes the heated metal to effect the cut.

The cutting torch may be one of a premixed or a postmixed type torch. In a premixed torch, preheat oxygen and fuel gas are mixed within the torch head before being discharged for ignition. In a postmixed cutting torch, the preheat oxygen and fuel gas are discharged from the torch in unmixed streams. Turbulence in the discharged streams mixes the oxygen and fuel gas before ignition occurs. A principal advantage of the postmixed cutting torch is that it is not subject to flashback, a potential hazard associated with the use of premixed torches. Flashback occurs when the oxygen and fuel gas mixture in a premixed torch ignites within the torch head. Postmixed torches are therefore preferred for heavy industrial applications where a torch is subjected to considerable heat. A further advantage of the postmixed torch is that postmixed nozzles produce a longer heat zone than premixed nozzles. This permits the postmixed torch to operate farther from the work, decreasing the heat stress on the torch and increasing the service life of the nozzle.

An example of a prior art postmixed oxy-fuel gas cutting torch and nozzle are taught in the U.S. Pat. No. 4,455,176 which issued to Fuhrhop on Jan. 19, 1984. That patent describes a combination cutting torch and nozzle assembly for postmixed oxy-fuel cutting using two separate annular streams of preheat oxygen gas surrounding the fuel gas stream with the inner annular preheat oxygen stream directed to impinge the fuel gas stream very close to the point of discharge from the nozzle assembly. The nozzle assembly is secured to the head of the cutting torch by a hollow retaining nut which forms an annular gap with the nozzle assembly for discharging the outer preheat oxygen gas stream.

All prior art postmixed nozzles for oxy-fuel gas torches operate in substantially the same way. A stream of cutting oxygen is discharged from an axial bore in the nozzle. A plurality of fuel gas discharge orifices arranged in a concentric ring around the axial bore discharge preheat fuel gas and a second plurality of gas discharge orifices arranged in an outer concentric ring discharge preheat oxygen which acts as an envelope that surrounds the fuel gas stream. As the gas streams flow toward the workpiece, a mixing of the fuel gas and the oxygen occurs and the mixture ignites to heat the workpiece.

Testing has shown that up to 50% of the preheat oxygen stream discharged from prior art postmixed torch nozzles is lost to the atmosphere before mixing with the fuel gas occurs. This contributes to inefficient combustion and slows the heating process. It also contributes to the cost of cutting since gases are not utilized to their potential. It has also been observed that prior art postmixed torch nozzles are incapable of effecting a parallel-sided cut through a thick workpiece. The cut is narrower along a top of the workpiece than along a bottom of the workpiece. The thicker the workpiece, the wider the cut at the bottom side. If many thick billets must be cut, a significant loss of metal occurs.

A further disadvantage of prior art cutting nozzles for postmixed oxy-fuel gas torches is their direct exposure to splashback of molten metal from the cut. Splashback metal tends to stick to the discharge end of the nozzle, frequently blocking discharge orifices. When this occurs, the torch must be shut down to permit the nozzle to be cleaned or replaced. This interrupts workflow and increases operating expenses.

SUMMARY OF THE INVENTION

It is an object of the invention to provide a cutting nozzle assembly which overcomes the disadvantages of the prior art.

It is a further object of the invention to provide a cutting nozzle assembly which promotes more efficient combustion of oxy-fuel gas mixtures.

It is yet a further object of the invention to provide a cutting nozzle assembly which minimizes nozzle damage due to the splashback of molten metal onto the discharge end of the nozzle.

It is yet a further object of the invention to provide a cutting nozzle assembly which provides a cleaner cut that minimizes the loss of metal during a cutting operation.

In accordance with the invention, there is provided a cutting nozzle for a postmixed oxy-fuel gas torch, the nozzle comprising a plurality of bores for respectively conducting fuel gas, preheat oxygen and cutting oxygen through the nozzle, each of the plurality of bores terminating in a respective discharge orifice; and a shroud disposed about and extending axially from the discharge orifices, the shroud having an axial extent sufficient to protect at least the discharge orifices from splash-back, promote mixing of gases discharged through the bores, and channel the discharged gases to produce a gas stream that maintains its shape over a greater distance than a similar nozzle not having a shroud.

The present invention therefore provides a cutting nozzle assembly for a postmixed oxy-fuel gas torch having a shroud which may be integrated with the discharge end, and which extends away from the discharge end of the nozzle to protect the discharge end of the nozzle from molten metal splashback and to concentrate, direct, and promote the mixing of the oxygen/fuel gas streams. This results in a narrower, cleaner, more parallel-sided cut which conserves metal at the cut and increases the speed and efficiency of cutting. The service life of the nozzle is further increased because the discharge end of the nozzle is shielded from splashback. Molten metal splashback having a trajectory which enters the throat of the shroud is generally cooled by the gas stream to a point that it does not fuse with the nozzle before it contacts the nozzle discharge end. Nozzles in accordance with the invention have been operated for weeks under industrial work conditions without requiring maintenance or replacement.

In accordance with a first embodiment of the invention, the shroud is an integral part of a retainer nut used to couple the nozzle to the torch and the retainer nut further includes a flange which is pierced with bores that discharge the preheat oxygen. This embodiment is particularly cost efficient to produce because it minimizes the quantity of metal required in the nozzle as well as the machining time required to form the nozzle assembly.

In accordance with a second embodiment of the invention, the shroud is an integral part of the retainer nut used to couple the nozzle to the torch, but the nozzle includes all of the gas discharge bores.

In accordance with third and fourth embodiments of the invention, the nozzle assembly is made of a single unit and the shroud is an integral part of the nozzle. These embodiments are evermore cost efficient to produce than the first or second embodiments because the unitary structure of the nozzle avoids the hollow structure of the retainer nut which is used to couple the nozzle to the torch. This minimizes the quantity of metal required to be removed and wasted during manufacturing, as well as the machining time required to form the nozzle unit. It is also advantageous to use a cutting nozzle having a unitary structure because it saves time for assembly and no assembly clearance exists between the nozzle and the retainer nut which may affect the accuracy of axial alignment of the gas passages of the nozzle and, therefore, the performance of the nozzle.

BRIEF DESCRIPTION OF THE DRAWINGS

These and other features of the invention will be more fully described by way of example only and with reference to the following drawings, wherein.

DETAILED DESCRIPTION OF THE PREFERRED EMBODIMENTS

Figure 1:
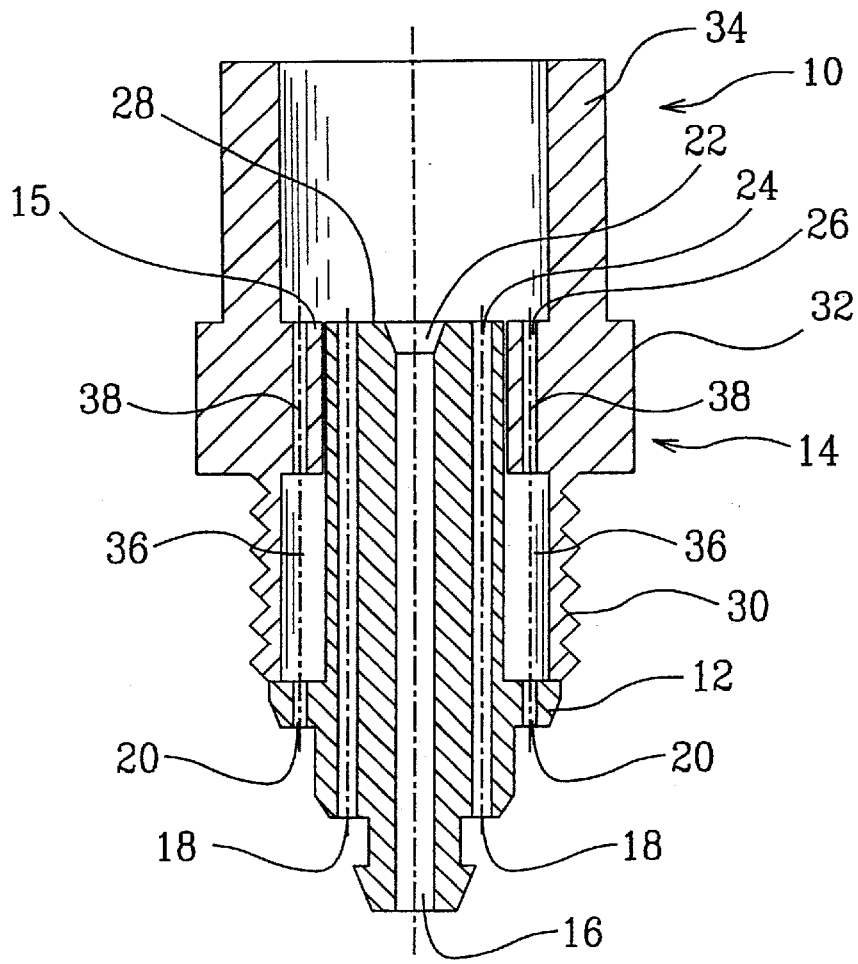
FIG. 1 is a longitudinal cross-sectional view of a preferred embodiment of a postmixed torch nozzle assembly in accordance with the invention.

FIG. 1 shows a longitudinal cross-sectional view of a cutting nozzle in accordance with a preferred embodiment of the invention. The cutting nozzle assembly, generally referred to by reference 10, includes a nozzle 12 and a hollow retainer nut 14. The nozzle 12 includes an axial bore 16 for discharging cutting oxygen from a cutting torch (see FIG. 5), a plurality of fuel gas bores 18 arranged in an inner concentric ring around the axial bore 16, and a plurality of preheat oxygen bores 20 arranged in an outer concentric ring around the axial bore 16. Each of the bores 16, 18 and 20 terminates in a discharge orifice 22, 24 and 26 respectively in a discharge end 28 of the cutting nozzle assembly 10.

Figure 5:
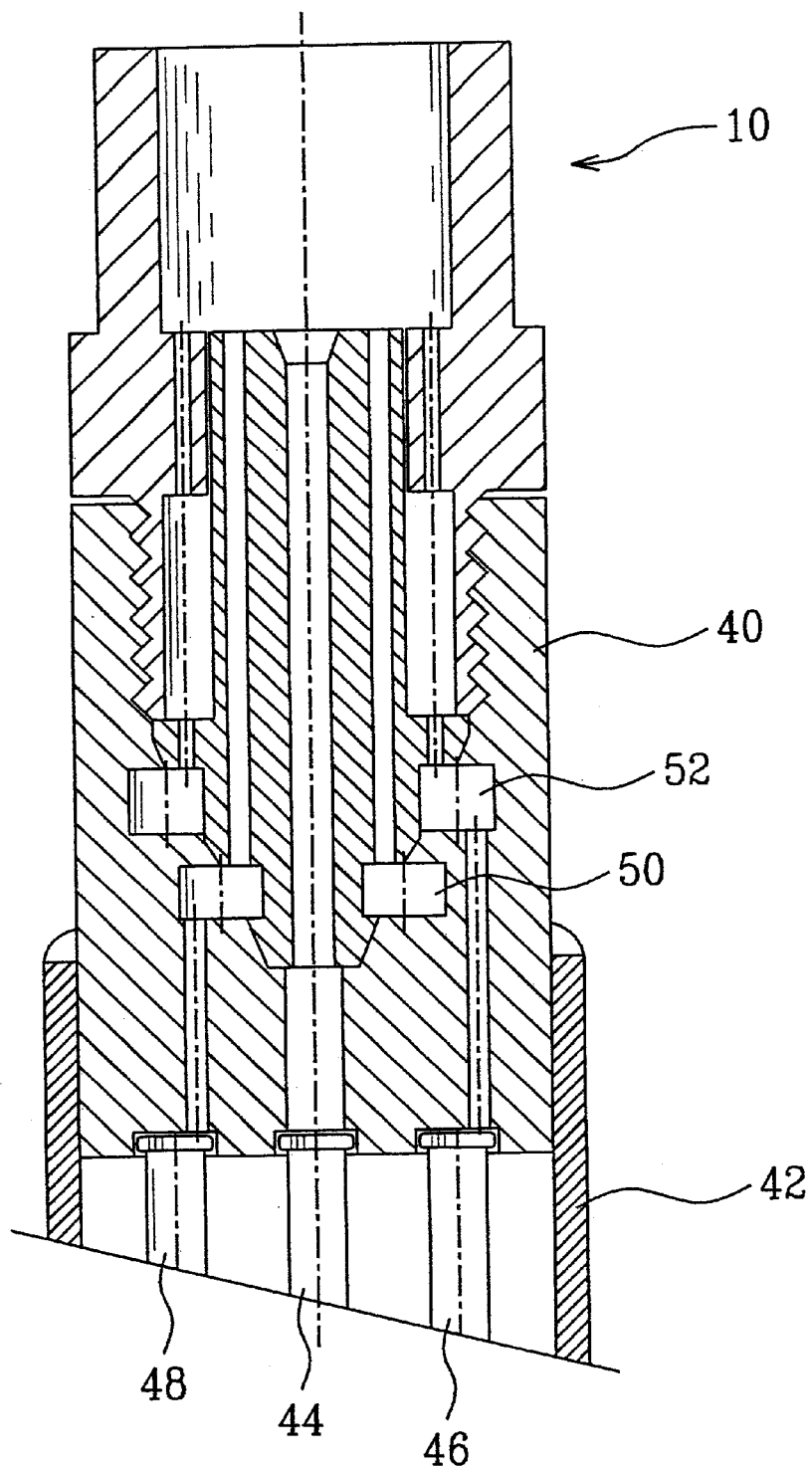
FIG. 5 is a partial cross-sectional view of the postmixed torch nozzle assembly shown in FIG. 1 coupled to a postmixed cutting torch.

The retainer nut 14 surrounds the nozzle 12 and is used to couple it with a cutting torch (see FIG. 5). In accordance with the preferred embodiment of the invention, an annular flange 15 in an inner periphery of the retainer nut 14 forms a portion of the discharge end 28 of the cutting nozzle assembly 10. The retainer nut 14 includes a spiral thread 30, a hexagonal rib 32 to provide a gripping surface for a wrench, and a shroud 34 which surrounds and extends away from the discharge end 28 of the cutting nozzle assembly 10. The shroud 34 is preferably a circular cylinder although other cylindrical shapes may also be used.

As described above, the retainer nut 14 preferably forms a part of the discharge end 28 of the cutting nozzle assembly 10. The hollow retainer nut 14 surrounds the nozzle 12. The preheat oxygen bores 20 in the nozzle 12 communicate with a cavity 36 in the retainer nut 14. The annular flange 15 of the retainer nut 14 is provided with preheat oxygen bores 38 which communicate with the preheat oxygen discharge orifices 26. Thus, preheat oxygen entering preheat oxygen bores 20 passes through the cavity 36 in the retainer nut 14 and exits through the preheat oxygen bores 38 via the preheat oxygen discharge orifices 26. This configuration of the cutting nozzle assembly 10 provides the most economically produced assembly because it minimizes drilling and material requirements.

Figure 2:
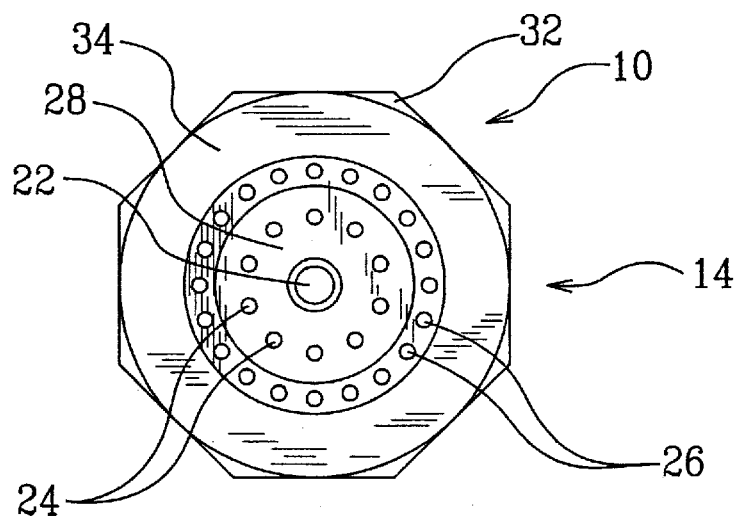
FIG. 2 is a top plan view of the postmixed torch nozzle assembly shown in FIG. 1.

FIG. 2 shows a top plan view of the cutting nozzle assembly 10 shown in FIG. 1. As is apparent, the hexagonal rib 32 of the retainer nut 14 provides a gripping surface for a wrench to facilitate coupling the cutting nozzle assembly to a torch. The shroud 34 surrounds the discharge end 28 of the cutting nozzle. The discharge end 28 includes discharge orifices 22 for cutting oxygen, 24 for fuel gas and 26 for preheat oxygen. The discharge orifice 22 for cutting oxygen is preferably flared. This creates a swirl effect within the interior of the shroud 34 to promote the mixing of fuel gas and oxygen. The shroud 34 also shields the discharge end 28 from molten metal splashed back from the cut. This enhances the service life of the nozzle because it substantially eliminates nozzle damage resulting from splashback metal contacting the nozzle and fusing with it.

Figure 3:
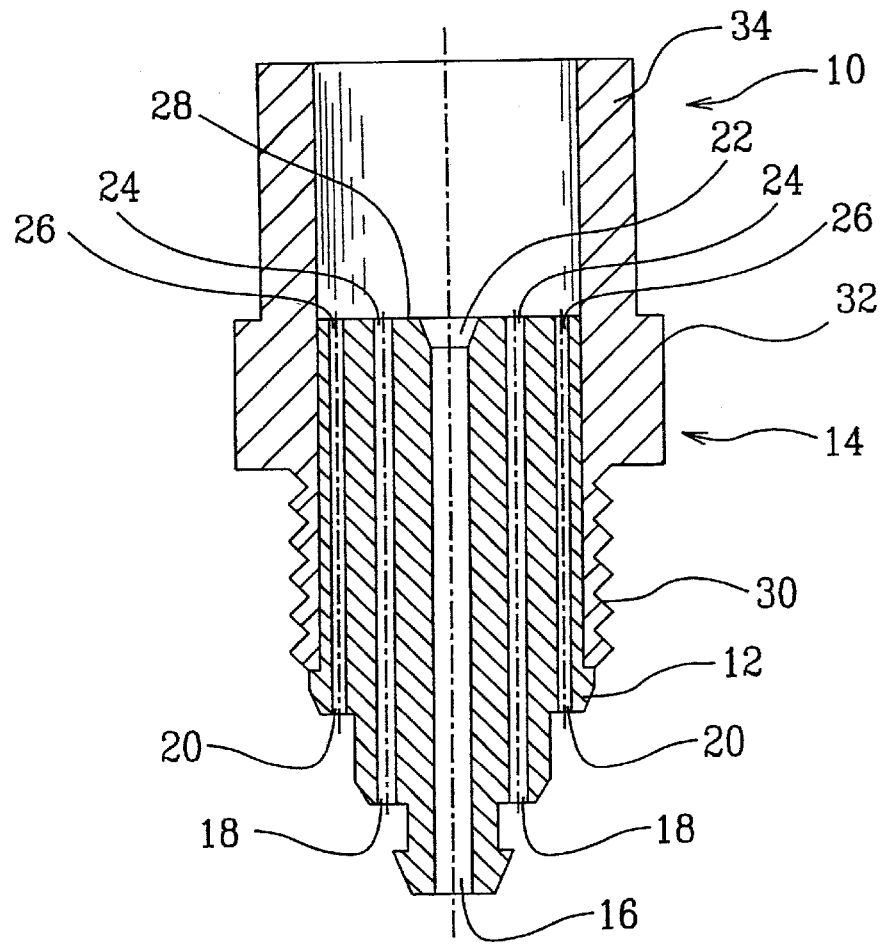
FIG. 3 is a longitudinal cross-sectional view of a second embodiment of a postmixed torch nozzle assembly in accordance with the invention.

FIG. 3 is a longitudinal cross-section through a second embodiment of the invention. The cutting nozzle assembly is substantially identical in structure to the assembly shown in FIGS. 1 and 2. In this embodiment, the nozzle 12 includes all of the discharge bores. The retaining nut 14 supports the shroud 34. The cutting oxygen discharge orifice 22, the fuel gas discharge orifices 24 and the preheat oxygen discharge orifices 26 are all located in the discharge end 28 of the nozzle 12. In all other respects, the cutting nozzle assembly 10, as shown in FIG. 2, is identical to the cutting nozzle assembly 10 shown in FIG. 1. This embodiment of the invention requires slightly more material to manufacture as well as more machining time but produces identical cutting results.

Figure 4:
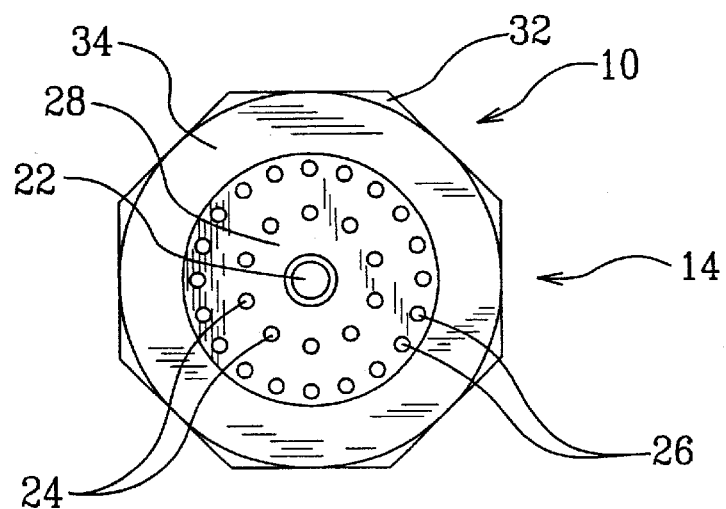
FIG. 4 is a top plan view of the postmixed torch nozzle assembly shown in FIG. 3.

FIG. 4 shows a top plan view of the nozzle shown in FIG. 3. The nozzle is identical to the embodiment shown in FIG. 2 except that there is no seam between the fuel gas discharge orifices 24 and the preheat oxygen orifices 26.

Cutting nozzle assemblies 10 are preferably constructed from brass alloy, although other materials such as copper, stainless steel and the like may also be used. The shroud 34 is preferably at least 0.65" (16.5 mm) long. Longer lengths may be used but much shorter lengths are not recommended. The thickness of the sidewall of the shroud 34 is preferably about 0.22" (5.58 mm) for good resistance to heat fatigue although a thinner sidewall may be used successfully. At least the outer surface of the sidewall of the shroud 34 is preferably plated with chrome or nickel to inhibit the adhesion of metal molten splashback.

FIG. 5 shows the cutting nozzle assembly 10 illustrated in FIG. 1 connected to a typical postmixed oxy-fuel gas torch. The oxy-fuel gas torch includes a torch head 40 to which the cutting nozzle fuel assembly is coupled using the retainer nut 14. The torch head 40 is supported by a tubular handle 42. The tubular handle is hollow. Extending through the tubular handle are supply tubes for cutting oxygen, fuel gas and preheat oxygen. Supply tube 44 supplies cutting oxygen from an oxygen source. Supply tube 46 supplies fuel gas from a fuel gas source, and supply tube 48 supplies preheat oxygen from the oxygen source. The fuel gas supply tube 46 and the cutting oxygen supply tube 48 terminate in circumferential distribution grooves 50 and 52, respectively. The operation of postmixed oxy-fuel gas torches is well understood by those skilled in the art.

Figure 6:
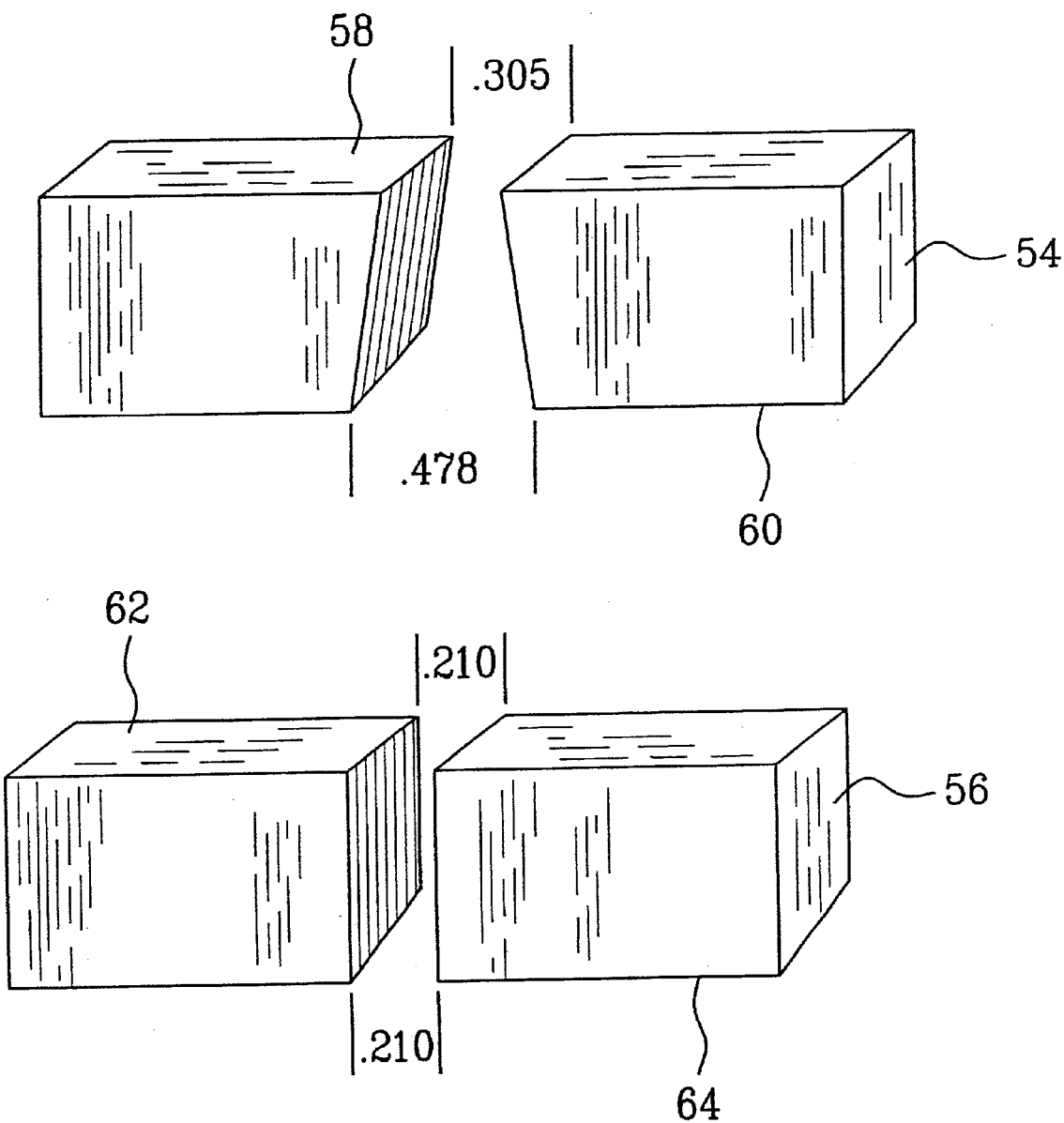
FIG. 6 is a schematic view of a cut through a 4¾ inch steel billet effected with a prior art cutting nozzle and a cut through the same billet effected with a cutting nozzle in accordance with the invention.

FIG. 6 shows a schematic diagram of two steel billets cut using a postmixed oxy-fuel gas torch. Each billet is approximately 4¾" (12 cm) thick. A first billet 54 was cut using a typical prior art postmixed cutting nozzle. A second billet 56 was cut using a cutting nozzle in accordance with the invention. As is apparent, the kerf of the cut through the second billet 56 is narrower and more parallel-sided than the kerf of the cut through the first billet 54. The kerf of the cut through the first billet 54 is approximately 0.305" (7.75 mm) wide where the cut commences at the top surface 58 of the first billet. The kerf is approximately 0.478" (12.14 mm) wide at the bottom surface 60 of the first billet 54. In contrast, the width of the kerf at the top surface 62 of the second billet 58 is approximately 0.21" (5.33 mm) wide and the kerf at the bottom surface 64 of the second billet 56 is also approximately 0.21" (5.33 mm) wide. It is, therefore, apparent that the cutting nozzle in accordance with the invention cuts a much thinner kerf and produces cut ends which are much more square than kerfs achieved with the prior art postmixed nozzles tested. Experimentation has established that a postmixed cutting nozzle in accordance with the invention produces approximately 40% less slag than a prior art nozzle of the same type. In a production environment, this represents a considerable saving in energy and cut materials. The cleaner kerf produced by a cutting nozzle assembly 10 in accordance with the invention is due to the tighter, more cylindrical gas discharge stream promoted by the shroud 34 (see FIGS. 1 through 5). The shroud 34 promotes a more thorough mixing of the preheat oxygen and the fuel gas and produces a gas stream that maintains its shape over a much longer distance than a gas stream discharged by prior art postmixed nozzles.

Figure 7:
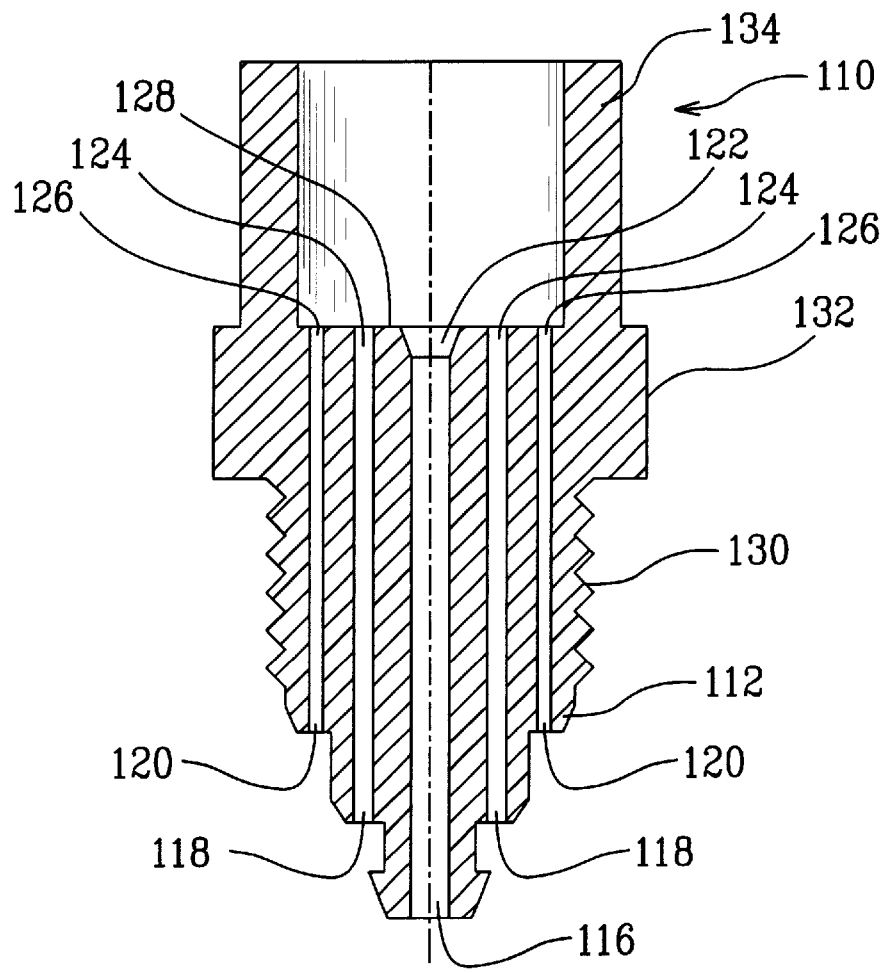
FIG. 7 is a longitudinal cross-sectional view of a third embodiment of postmixed torch nozzle assembly in accordance with the invention.

FIG. 7 shows a longitudinal view of a cutting nozzle in accordance with a third embodiment of the invention. The cutting nozzle, generally referred to by reference numeral 110, is substantially identical in structure to the combined nozzle/nut assembly shown in FIGS. 1 through 4. In this third embodiment, the nozzle 110 includes a nozzle portion 112 and a shroud 134. The nozzle portion 112 includes an axial bore 116 for discharging cutting oxygen from a cutting torch, a plurality of fuel gas bores 118 arranged in an inner concentric ring around the axial bore 116, and a plurality of preheat oxygen bores 120 arranged in an outer concentric ring around the axial bore 116. Each of the bores 116, 118 and 120 terminates in a respective discharge orifice 122, 124 and 126, in a discharge end 128 of the cutting nozzle portion 112. The discharge orifice 122 of the axial bore 116 has a flared portion. All of these features are closely similar to the embodiment shown in FIG. 3. However, the shroud 134, a spiral thread 130 for engaging a complementary thread in the postmixed oxy-fuel gas torch and a hexagonal rib 132 adapted to provide a gripping surface for a wrench are formed as an integral part of the nozzle 110, instead of a separate part of the nozzle assembly 10 as shown in FIG. 1. The entire nozzle 110 can thus be conveniently manufactured from a single piece of bar stock, such as, for example, commercially available 1.25" hexagonal copper bar stock. In this case, the shroud 134 can conveniently be provided as an axial bore in one end of the nozzle blank. The exterior surface of the shroud can be turned (e.g. on a lathe) to provide a circular cylindrical surface as shown in the illustrated embodiments, or alternatively, left in its original hexagonal shape.

This embodiment of the invention avoids producing a hollow retainer nut 14, as shown in FIGS. 1 and 3, which requires material removal therefrom to form a cavity to receive the nozzle 12. The unitary nozzle 110, therefore, requires much less machining time and decreases material waste.

Figure 8:
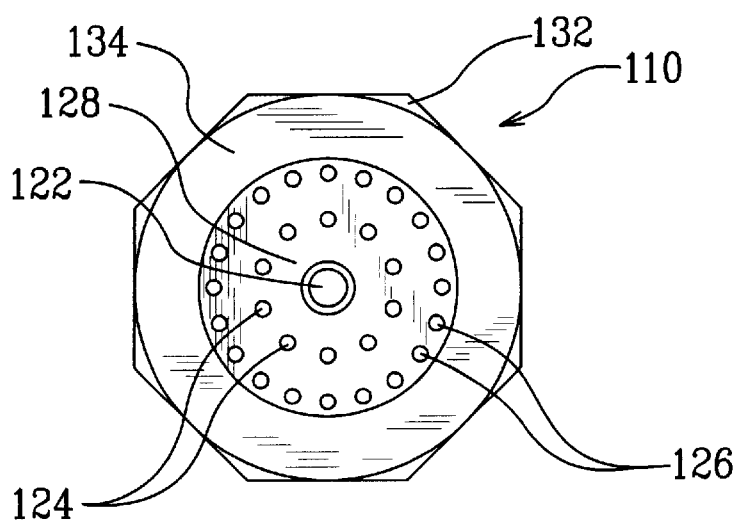
FIG. 8 is a top plan view of the postmixed torch nozzle assembly shown in FIG. 7.

FIG. 8 shows a top plan view of the nozzle shown in FIG. 7. The view is identical to the view shown in FIG. 4 even though FIG. 8 illustrates the top view of the unitary nozzle 110 but FIG. 4 illustrates a nozzle assembly 10 made of two pieces.

Figure 9:
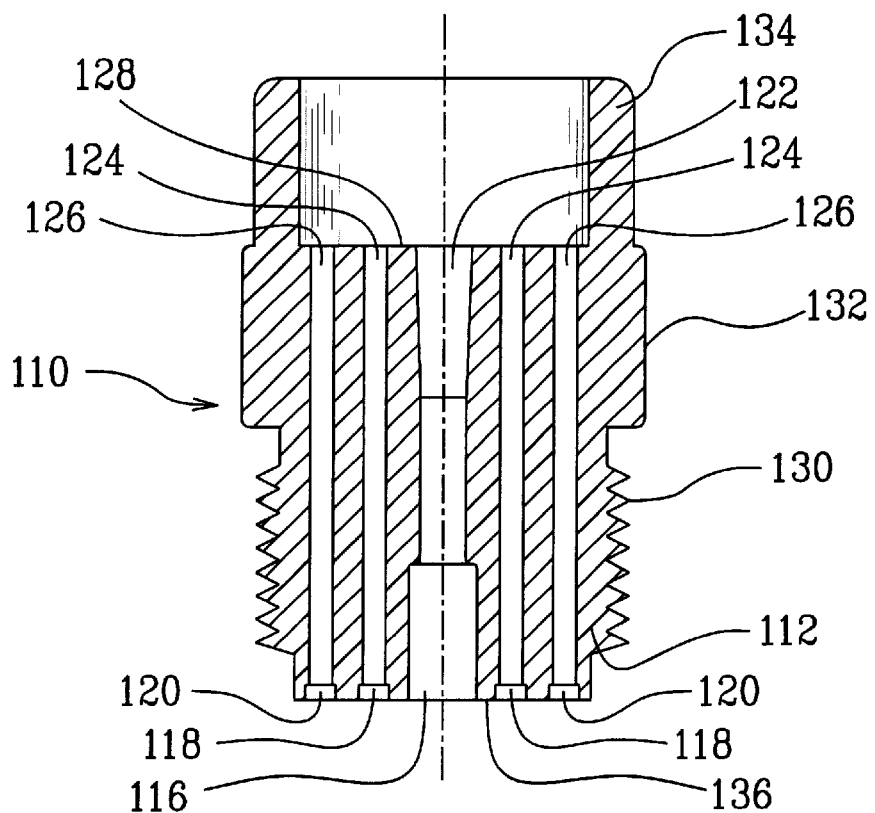
FIG. 9 is a longitudinal cross-sectional view of a fourth embodiment of a postmixed torch nozzle assembly in accordance with the invention.

FIG. 9 is a longitudinal cross-section through a fourth embodiment of the invention. The cutting nozzle 110 is closely similar in structure to the cutting nozzle shown in FIG. 7 and is a unitary structure. In this embodiment, the nozzle portion 112 includes a flat intake end 136 and all bores 116, 118 and 120 extend from the flat intake end 136, terminating in orifices 122, 124 and 126 on the discharge end 128. The axial bores 116 has an entrance portion which has an enlarged diameter for connecting with a respective gas passage in a torch head, not shown. The bores 118 and 120 have an entrance portion defined by respective circumferential grooves which form distribution channels for the pre-heat oxygen and the fuel gas when the nozzle is installed in a torch (not shown). The flared portion of the orifice 122 at the discharge end is longer and the flared angle is smaller than those of the similar structure shown in FIG. 7. The shroud 134, in this embodiment, can be thinner than the shroud in the other embodiments, for example, by about 0.139" (3.53 mm). In all other respects, the cutting nozzle 110, as shown in FIG. 9, is identical to the cutting nozzle 110, shown in FIG. 7. This embodiment of the invention is used for coupling a type of postmixed oxy-fuel gas torch having a flat seat on which the flat intake end of the nozzle is seated.

Figure 10:
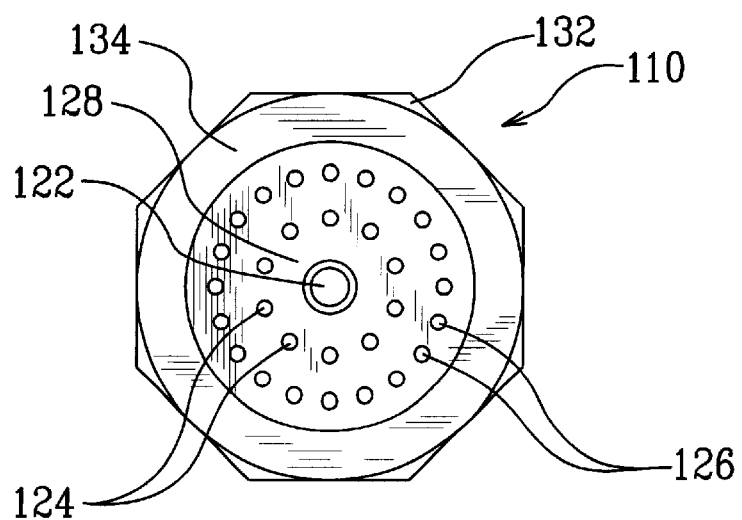
FIG. 10 is a top plan view of the postmixed torch nozzle assembly shown in FIG. 9.

FIG. 10 shows a top plan view of the nozzle shown in FIG. 9. The view is identical to the view shown in FIG. 8, except that the sidewall of the shroud 134 is thinner.

INDUSTRIAL APPLICABILITY

The cutting nozzle for a postmixed oxy-fuel gas torch in accordance with the invention is useful in cutting steel and other ferrous alloys, particularly in industrial production environments such as steel mills where large slabs must be cut into billets for handling or processing. Because the cutting nozzle provides a cleaner and narrower cut than prior art nozzles of the same type, the nozzle conserves materials and energy. The cutting nozzle assembly also has a prolonged service life because it is less susceptible to damage due to the splashback of molten metal. Operating overheads are therefore reduced. The cutting nozzle assembly 10 in accordance with the invention may be used in any application where metals must be rapidly and efficiently cut by oxidation.

It is therefore apparent that a new and useful cutting nozzle for postmixed oxy-fuel gas torches has been invented.

The embodiments described above are intended to be exemplary only. Those skilled in the art will understand that certain prior art postmixed nozzle constructions may be modified to accord with the invention by welding or soldering a shroud to either the retainer nut or the discharge end of the prior art nozzle or by redesigning a retainer nut to include an integral shroud. Changes and modifications to the specifically described embodiments may be made without departing from the scope of the invention which is intended to be limited solely by the scope of the appended claims.

I claim:

1. A cutting nozzle for a postmixed oxy-fuel gas torch, the nozzle comprising:
   an integral body having a plurality of bores for respectively conducting fuel gas, preheat oxygen and cutting oxygen through the nozzle, each of the plurality of bores terminating in a respective discharge orifice;
   a shroud disposed about and extending axially from the discharge orifices, the shroud having an axial extent sufficient to protect at least the discharge orifices from splash-back, promote mixing of gases discharged through the bores, and channel the discharged gases to produce a gas stream that maintains its shape over a greater distance than a similar nozzle not having a shroud; and
   the integral body comprises a helical thread adapted to engage a complimentary thread in the postmixed oxy-fuel gas torch.

2. A cutting nozzle as claimed in claim 1 wherein the shroud comprises a side wall defining a circular cylinder substantially coaxial with the axial bore for cutting oxygen.

3. A cutting nozzle as claimed in claim 1 wherein the integral body includes a parallel flat surface that may be gripped by a wrench to install the nozzle in a postmixed oxy-fuel gas torch or remove the nozzle from the torch.

4. A cutting nozzle for a postmixed oxy-fuel gas torch, comprising:
   a nozzle body having an intake end and a discharge end, the intake end being adapted to be received in a nozzle seat of the postmixed oxy-fuel torch;
   the nozzle body including respective passages for directing cutting oxygen gas, preheat oxygen gas and fuel gas from the torch to the discharge end of the nozzle body;
   the nozzle body further including a helical thread for engaging a complimentary thread in the postmixed oxy-fuel gas torch, and a gripping surface for a wrench used to connect the nozzle to the torch, the helical thread and the gripping surface being formed integrally with an exterior of the nozzle body; and
   a shroud surrounding the discharge end, the shroud being an integral part of the nozzle body and extending in an axial direction away from the discharge end of the nozzle body to an open end to form a chamber having an axial extent adequate to promote a mixing action of the gases discharged from the passages and produce a gas stream that maintains its shape over a longer distance than a postmixed nozzle not having a shroud.

5. A cutting nozzle as claimed in claim 4 wherein the passages include an axial bore through which cutting oxygen gas is discharged and a first and second plurality of spaced-apart gas discharge bores arranged in inner and outer concentric rings around the axial bore, the inner ring being in fluid communication with a fuel gas conduit of the torch when the nozzle is coupled with the torch and the outer ring being in fluid communication with a preheat oxygen gas conduit of the torch when the nozzle is coupled with the torch, the axial bore and the gas discharge bores terminating in discharge orifices on the discharge end of the nozzle body.

6. A cutting nozzle as claimed in claim 5 wherein the shroud has a side wall having a length at least 0.65 inches.

7. A cutting nozzle as claimed in claim 6 wherein the side wall is about 0.139 to 0.22 inches thick.

8. A cutting nozzle as claimed in claim 6 wherein the cutting nozzle is constructed from brass.

9. A cutting nozzle as claimed in claim 8 wherein at least an outer surface of a side wall of the shroud is plated with a one of chrome and nickel to inhibit the adhesion of molten metal splashback to the outer surface.

* * * * *